United States Patent
Zelenov et al.

(10) Patent No.: US 10,509,688 B1
(45) Date of Patent: Dec. 17, 2019

(54) SYSTEM AND METHOD FOR MIGRATING VIRTUAL MACHINES BETWEEN SERVERS

(71) Applicant: Parallels International GmbH, Schaffhausen (CH)

(72) Inventors: Anton Zelenov, Moscow (RU); Nikolay Dobrovolskiy, Moscow (RU); Serguei M. Beloussov, Costa Del Sol (SG)

(73) Assignee: Parallels International GmbH, Schaffhausen (CH)

(*) Notice: Subject to any disclaimer, the term of this patent is extended or adjusted under 35 U.S.C. 154(b) by 272 days.

(21) Appl. No.: 15/636,701

(22) Filed: Jun. 29, 2017

(51) Int. Cl.
*G06F 3/06* (2006.01)
*G06F 9/455* (2018.01)
*G06F 9/50* (2006.01)

(52) U.S. Cl.
CPC .......... *G06F 9/5088* (2013.01); *G06F 3/0647* (2013.01); *G06F 9/45558* (2013.01); *G06F 2009/4557* (2013.01); *G06F 2009/45583* (2013.01)

(58) Field of Classification Search
CPC .. G06F 9/5088; G06F 3/0647; G06F 9/45558; G06F 2009/4557; G06F 2009/45583
See application file for complete search history.

(56) References Cited

U.S. PATENT DOCUMENTS

| | | | |
|---|---|---|---|
| 8,266,618 B2 * | 9/2012 | Iorio | G06F 9/4856 709/226 |
| 8,607,054 B2 * | 12/2013 | Ramarathinam | H04L 63/0807 709/227 |
| 2011/0314470 A1 * | 12/2011 | Elyashev | G06F 11/1484 718/1 |

* cited by examiner

Primary Examiner — Emerson C Puente
Assistant Examiner — Jonathan R Labud
(74) Attorney, Agent, or Firm — Arent Fox LLP; Michael Fainberg (57) ABSTRACT

A system and method is provided for migrating a virtual machine between servers to access physical resources. An exemplary method includes intercepting a request from a client device to access a physical resource; identifying a virtual machine on a first server that is currently hosting a remote application for the client device; identifying a second server associated with the physical resource; and migrating the virtual machine from the first server to the second server, such that the client device can access the physical resource using the second server.

18 Claims, 5 Drawing Sheets

SYSTEM AND METHOD FOR MIGRATING VIRTUAL MACHINES BETWEEN SERVERS

TECHNICAL FIELD

The present disclosure generally relates to managing computing system resources, and, more particularly, to a system and method for migrating a virtual machine between servers to access physical resources.

BACKGROUND

There currently exists many type of complex computing devices that are quite expensive, but not used very frequently by a particular user owning such equipment. For example, GPU ("graphics processing unit") accelerated computing, using Nvidia® Tesla® GPU accelerators and Intel® Xeon Phi™ coprocessors, can run applications ten times faster (or more) than typical applications to accelerate scientific research, for example. Other types of complex computing devices include robotic equipment, DNA sequencers, and the like, for example.

The problem is that most users/researchers that work with these types of equipment only use it a fraction of the time and most of the labor-intensive work focuses on the results of program execution. Therefore, it is often impractical or simply not possible for individual users to access and use this type of equipment in a convenient matter. Accordingly, what is a system and method the enables users to easily access such equipment without requiring the user to actually purchase, lease, etc., the equipment.

SUMMARY

Accordingly, a system and method is provided for migrating a virtual machine between servers to access physical resources. In the exemplary aspect, the method includes intercepting, by a processor, a request from a client device to access a physical resource; identifying, by the processor, a virtual machine on a first server that is currently hosting a remote application for the client device; identifying, by the processor, a second server associated with the physical resource; and migrating, by the processor, the virtual machine from the first server to the second server, such that the client device can access the physical resource using the second server.

In another exemplary aspect, the method includes upon intercepting the request from the client device to access the physical resource, determining whether the physical resource is available for access; and pausing operation of the virtual machine if the physical resource is not available for access.

In another exemplary aspect, the method includes continuously checking whether the physical resource is available for access and migrating the virtual machine to the second server upon determining the physical resource is available for access.

In another exemplary aspect, the method includes maintaining a same user session of the virtual machine launched by the client device when the virtual machine is migrated from the first server to the second server.

In another exemplary aspect, the method includes migrating, by the processor, the virtual machine from the second server to the another server after the client device accesses the physical resource using the second server.

In another exemplary aspect of the method, the first and second servers are included in a server farm comprising a plurality of servers.

In another exemplary aspect of the method, the second server is physically connected to the requested physical resource.

In another exemplary aspect of the method, the intercepting of the request to access a physical resource comprises registering, by a software module executed by the processor, with a globally unique identifier and exporting functions of an original library of the physical resource; and sending function calls directly to the original library of the physical resource if the virtual machine is running on the second server associated with the requested physical resource.

In another exemplary aspect of the method, the intercepting of the request to access a physical resource comprises monitoring, by the processor, a physical connection between the second server and the requested physical resource; tuning at least one interface of the requested physical resource to at least one pipe; and wrapping the at least one pipe to software associated with the second sever to provide access to at least one hardware port of the requested physical resource by the virtual machine.

In another exemplary aspect, a system is provided for migrating a virtual machine between servers to access physical resources. In this aspect, the system includes memory configured to store association information between at least one physical resource and an associated server; and a processor configured to intercept a request from a client device to access the at least one physical resource; identify a virtual machine launched on a first server that is currently hosting a remote application for the client device; identify a second server associated with the physical resource based on the association information stored in the memory; and migrate the virtual machine from the first server to the second server, such that the client device can access the physical resource using the second server.

In another exemplary, a non-transitory computer readable medium storing computer executable instructions is provided for migrating a virtual machine between servers to access physical resources. In this aspect, instructions are provided for intercepting a request from a client device to access a physical resource; identifying a virtual machine on a first server that is currently hosting a remote application for the client device; identifying a second server associated with the physical resource; and migrating the virtual machine from the first server to the second server, such that the client device can access the physical resource using the second server.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

Figure 1A:
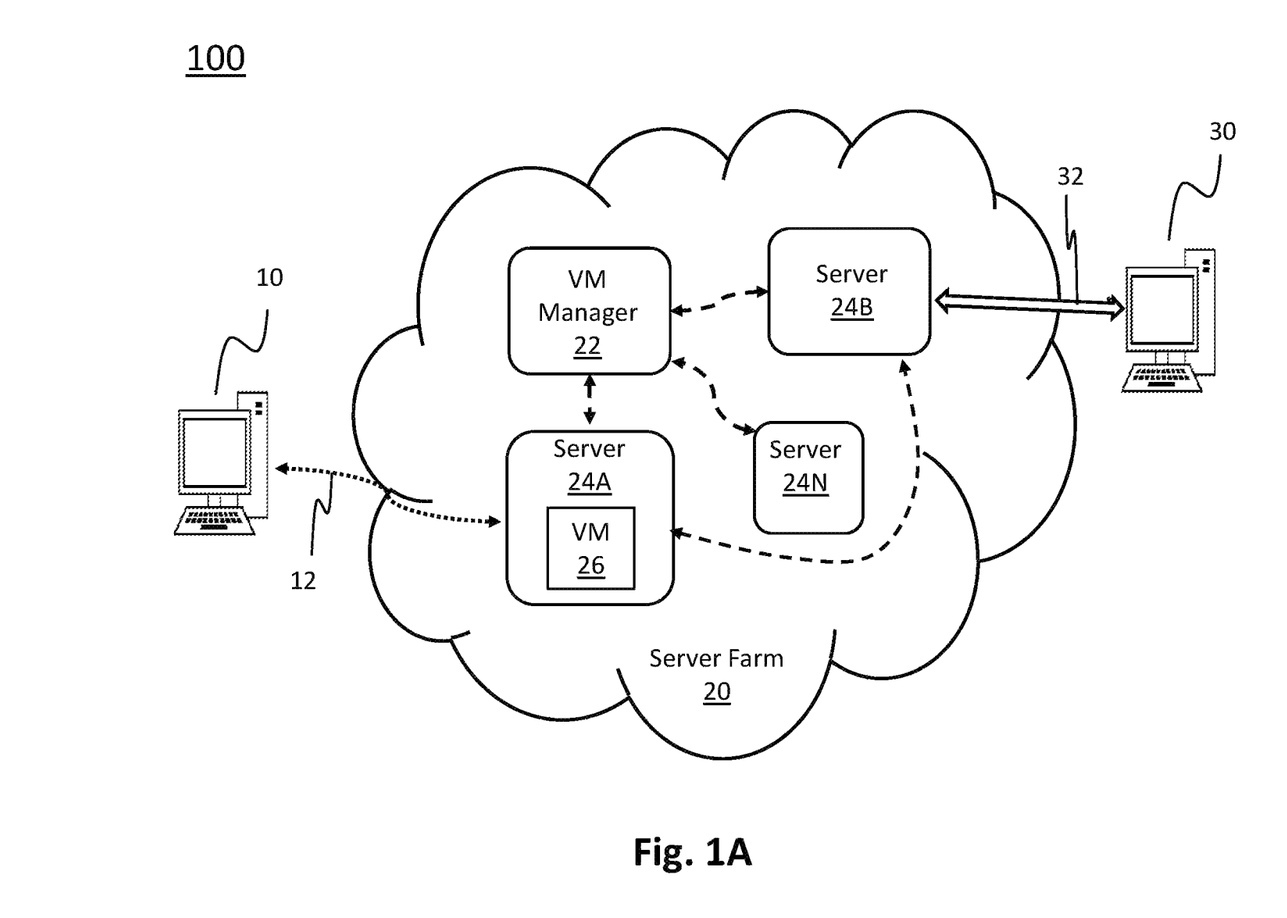
FIGS. 1A and 1B illustrate a block diagram of a system for migrating a virtual machine between servers to access physical resources according to an exemplary aspect.
Figure 1B:
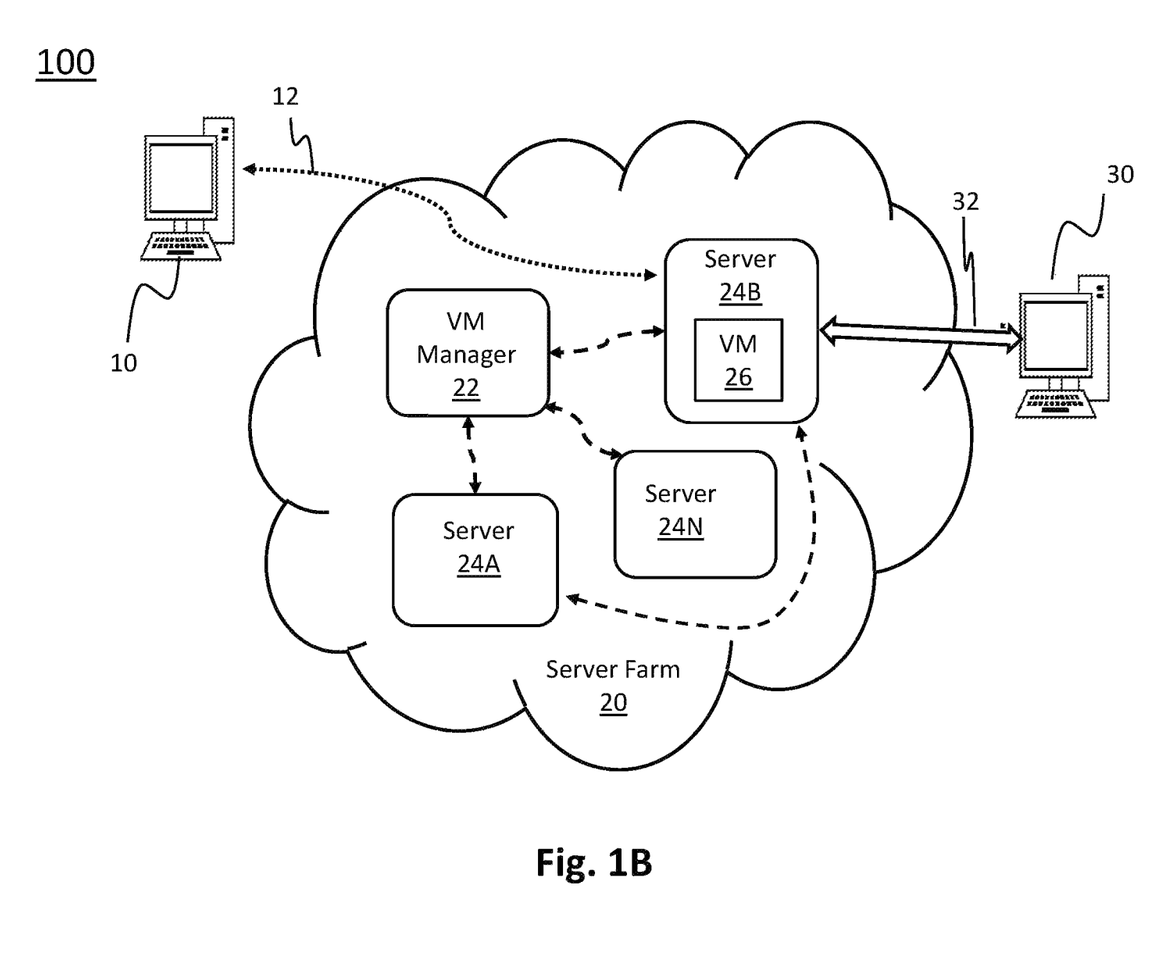

FIGS. 1A and 1B illustrate a block diagram of a system for migrating a virtual machine between servers to access physical resources according to an exemplary aspect. As shown, the system 100 includes a client device 10, a server farm 20 and physical equipment 30. The client device 10 can be any type of computing device (e.g., personal computer, laptop, server, and the like) that includes conventional hardware and/or software components that are well known to those in the art and are not illustrated in FIGS. 1A and 1B. For example, the host computing system will include one or more processors, a kernel, I/O interfaces, and the like.

It should be appreciated that the client device 10 can be operated by a user who may be performing research, testing, etc., as described above, and needs to access physical equipment 30. In this regard, the physical equipment 30 is not so limited, but can be any type of super computer (e.g., using GPU accelerated computing), robotics, a DNA sequencer, or the like, as generally described above.

As further shown, the server farm 20 (also known as a server cluster) can be a collection of computer servers (i.e., server 24A, server 24B . . . server 24N) that can be maintained by an organization, for example, to supply server functionality to a plurality of client computers, including client device 10. Although only three servers 24A-24N are shown, it should be appreciated that server farm 20 can be comprised of any number of servers (e.g., hundreds of computers or more). Moreover, although not shown, the server farm 20 can optionally include backup servers that take over the function of primary servers 24A-24N in the event of a primary-server failure. The server farm 20 can also be organized and connected with the network switches and/or routers that enable communication between the different parts of the farm and the users of the farm 20. For purposes of this disclosure, the network connections within the server farm 20 are simply shown as dashed two-way arrows illustrating possible communication paths. Moreover, it should be appreciated that the servers 24A to 24N and related components, including the routers, power supplies, and the like, can be located on racks in a server room or data center, for example.

As shown in FIG. 1A, the client device 10 can be configured to work remotely with the server farm 20. In particular, the client device 10 can be configured to communicate remotely with server farm 20 over a network (shown simply as arrow 12), which can be any type of applicable network for communicating data and data operations and can include a communication system (not shown) that connects the client device 10 to the server farm 20 by wire, cable, fiber optic, and/or wireless links facilitated by various types of well-known network elements, such as hubs, switches, routers, and the like. It should be appreciated that the network may employ various well-known protocols to communicate information amongst the network resources. In one aspect, the network can be part of the Internet as would be understood to one skilled in the art.

Moreover, the client device 10 can be installed with remote desktop software using, for example, Microsoft® Remote Desktop Protocol ("RDP") or virtual network computing ("VNC") to user a remote desktop running on a virtual machine of one of the servers in server farm 20. For example, in the initial configuration shown in FIG. 1A, client device 10 is using virtual machine 26 as a remote desktop on server 24A, i.e., client device 10 has launched a user session of a remote desktop on server 24A, for example. In one further aspect, a virtual machine manager 22 can receive and/or manage user sessions of remote desktop applications from client devices on the plurality of servers in the server farm 20.

In general, virtual machines are well known in the art as isolated execution environment that running can run simultaneously on a same physical machine, for example. Each virtual machine instance executes its own OS kernel and can be supported by a virtual machine monitor ("VMM") and/or a hypervisor, which is control software having the highest privilege level for administrating hardware computer resources and virtual machines. According to the exemplary aspect, the virtual machine manager 22 can utilize such control software to manage the operation and migration of virtual machines between the different hardware resources of each server in the server farm 20.

Thus, according to the exemplary aspect, the server farm 20 includes the virtual machine manager 22 configured to manage which server will be allocated to each client device, such as client device 10, requesting a service (e.g., access and use of physical equipment 30) of the server farm 20. Thus, as will be further described below, the virtual machine manager 22 is configured to monitor and manage each virtual machine operating on each server (e.g., server 24A shown in FIG. 1A). If a client device 10 makes a specific request to access and use physical equipment associated with another server, the virtual machine manager 22 is configured to intercept this request and migrate the virtual machine 26 from a first server not associated with the physical equipment to a second server associated with the physical equipment.

In general, the concept of virtual machine migration is the process of suspending the virtual execution environment of the virtual machine 26 on the first hardware platform (i.e., server 24A) and starting it on a second, different hardware platform (i.e., server 24B) and can be done using an intermediate data container, for example. Optionally, data in an intermediate data container may be converted to another format or to be updated to provide hardware compatibility. An exemplary system and method for migration of virtual execution environment (i.e., non-hypervisor virtualization) is described in U.S. Pat. No. 8,984,510, the contents of which are hereby incorporated by reference.

As described above, the physical equipment 30 is preferably some type of specialized, complex, and/or expensive equipment (e.g., a GPU) that client device 10 may not normally have access to or need. Moreover, the physical equipment 30 preferably has a physical connection 32 connected to a specific server (i.e., server 24B) in the server farm 20. The physical connection 32 can be, for example, a universal serial bus ("USB") connecting I/O ports of the server 24B and the physical equipment 30. In an alternative aspect, the server 24B can be remotely coupled to the physical equipment 30 as long as there is sufficient bandwidth to facilitate use by the client device 10 of the physical equipment 30 through the associated server. In either case, the specific server (i.e., server 24B) can be considered to be "associated with" or "designated for" the physical equipment 30.

Thus, according to the exemplary aspect, the virtual machine manager 22 can be configured to monitor the status and use of the physical equipment 30. Thus, the physical equipment 30 preferably has a standard software interface (e.g., a library) that can be patched in runtime or a hardware interface (e.g., USB/Serial/Parallel port) of which activity can be monitored by a host operating system of the virtual machine manager 22, for example.

FIG. 1B illustrates a block diagram of the system 100 after the virtual machine 26 has been migrated according to an exemplary aspect. As described above, the server 24B is preferably physically connected (by a USB, for example) to equipment 30 (e.g., a GPU). According to the exemplary aspect, when the client device 10 sends a request using virtual machine 26, which is initially running on server 24A, to access the physical equipment 30, the relevant software application running on the virtual machine 26 will attempt to start using the equipment 30 using a conventional software call to the equipment library or hardware. The virtual machine manager 22 is configured to intercept the software call to equipment library or hardware using a software library monitor or virtual machine monitor, as described below, depending on the mechanism used to intercept data and command transfer to specific equipment.

Furthermore, upon intercepting the access request, the virtual machine manager 22 is configured to pause virtual machine 26 running on the first server 24 and check whether the physical equipment 30 is in use as described above. If the equipment 30 is not in use, the virtual machine manager 22 will migrate the virtual machine to the server associated with the equipment 30, i.e., server 24B. Otherwise, the virtual machine manager 22 will maintain the virtual machine 26 in a paused state on the server 24A until equipment 30 (i.e., the requested resource) is available. Moreover, in one aspect, the virtual machine manager 22, via the server 24A, for example, can cause a message to be displayed on client device 10 informing the user that resource (i.e., equipment 30) is currently unavailable and that the virtual machine 26 has been placed in queue with other virtual machines that need and/or are using the equipment and that the user will gain access to the equipment in due time when the requested resource becomes available.

Figure 2:
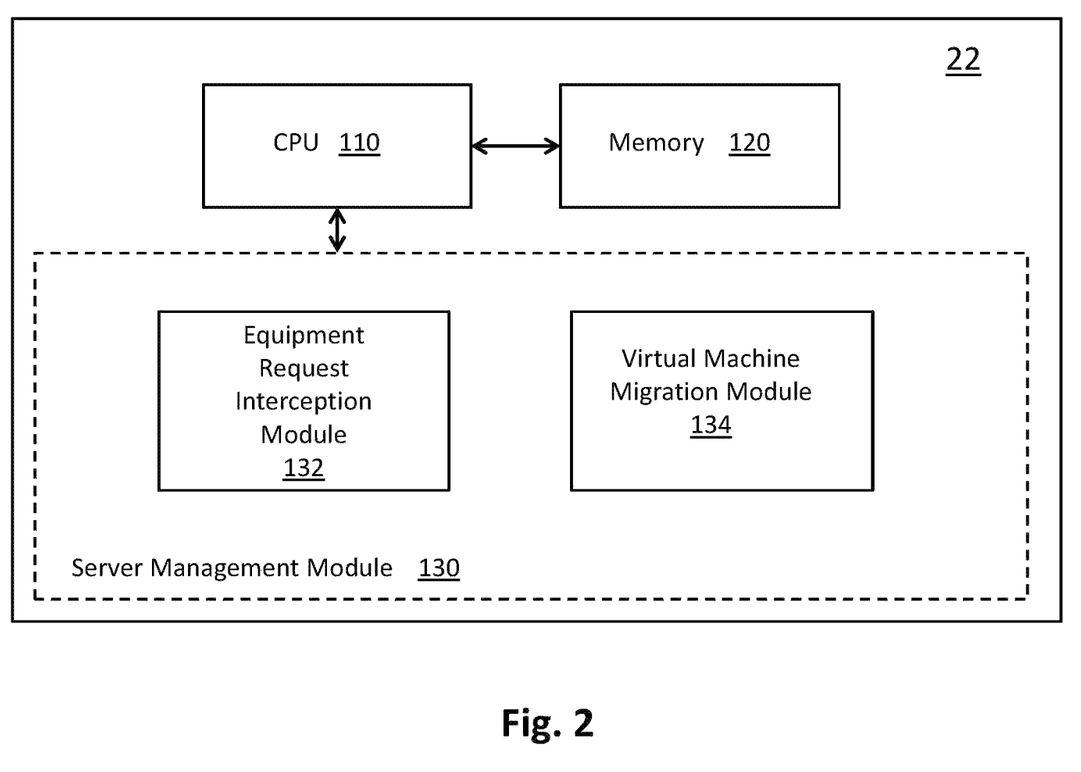
FIG. 2 illustrates a block diagram of a virtual machine manager for migrating a virtual machine between servers in the server farm according to an exemplary aspect.
Figure 4:
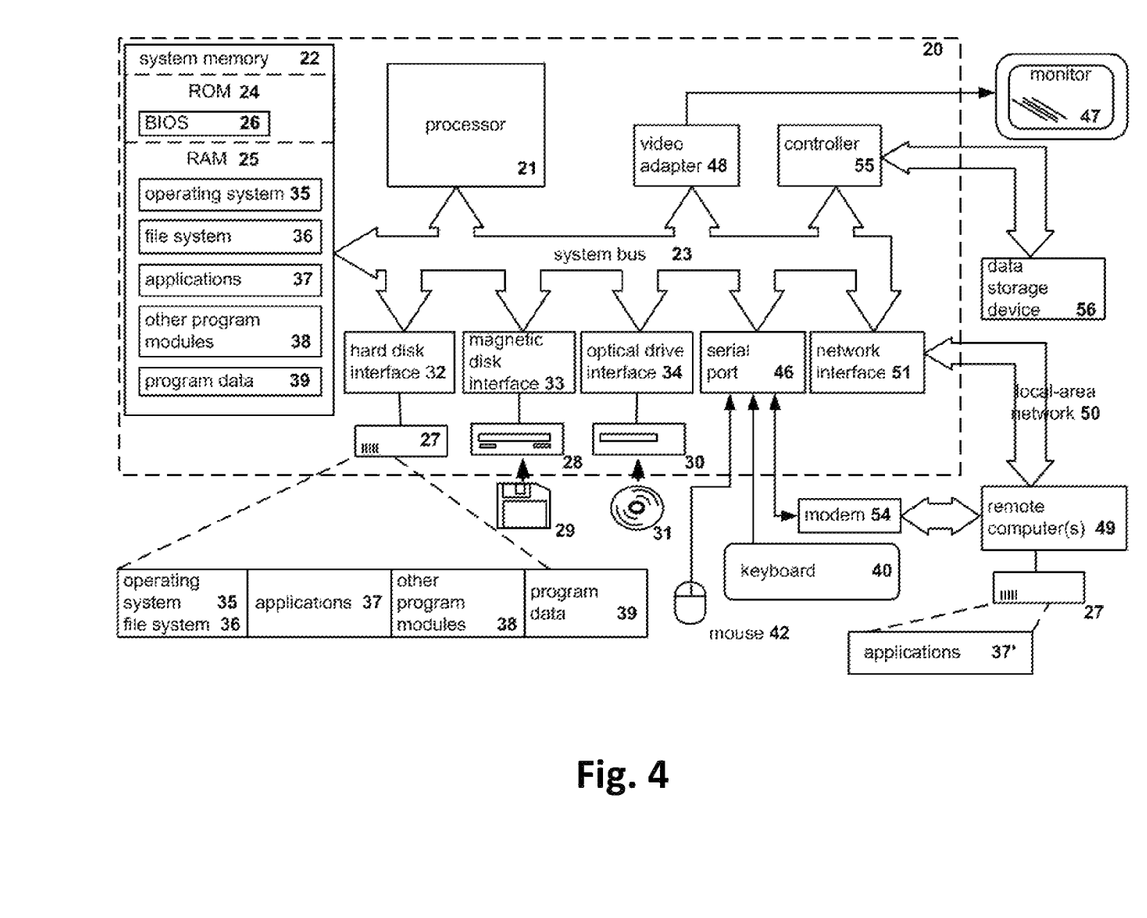
FIG. 4 illustrates a block diagram of an example of a general-purpose computer system (which can be a personal computer or server) on which the disclosed system and method can be implemented according to an exemplary aspect.

FIG. 2 illustrates a block diagram of a virtual machine manager 22 for migrating a virtual machine between servers in the server farm according to an exemplary aspect. An exemplary block diagram of a computing device capable of serving as the virtual machine manager 22 is illustrated in FIG. 4 and described below. However, as generally shown in FIG. 2, the virtual machine manager 22 will include one or more central processing units ("CPU") 110 provided to, among other things, execute a virtual machine management module 130. In this aspect, the virtual machine management module 130 includes software code (e.g., processor executable instructions) in memory, which may be configured to execute/facilitate the virtual machine monitoring and migration algorithms according to the exemplary aspects described herein. In general, as used herein, the term "module" refers to a software service or application executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein. For purposes of this disclosure below with respect to the exemplary algorithms, the disclosure generally refers to the virtual machine manager 22 and/or CPU 110 and/or one of the specific modules as shown to perform the various steps of the algorithm.

As further shown, the virtual machine manager 22 can include memory 120 (e.g., ROM) that can be provided to store information relating to the different servers (e.g., servers 24A . . . 24N) in server farm 20. For example, as described above, certain servers, such as server 24B, can be associated with and/or physically connected to special physical equipment 30. In this aspect, the memory 120 of the virtual machine manager 22 can include a database providing the association information between physical equipment and each server. Then, upon receiving intercepting a request by a client device (e.g., client device 10) to access and use specific physical equipment 30, the virtual machine manager 22 can look up in the database 120 the specific equipment (there could be multiple instances of the same equipment, such as two or more GPUs) and then determine which server is associated with each case of the physical equipment. Likewise, the virtual machine manager 22 can also track which server in the server farm 20 is currently hosting a remote desktop application (or similar user session) for each client device. This information can be easily accessed and referenced to facilitate the migration process.

As further shown, the virtual machine management module 130 includes a plurality of sub-modules, including equipment request interception module 132 and virtual machine migration module 134. As described above, if a client device (e.g., device 110) makes a specific request to access and use physical equipment (e.g., equipment 30) coupled to another server (e.g., server 24B), the virtual machine manager 22, and specifically the equipment request interception module 132, is configured to intercept this request and determine whether the requested physical equipment is available for access and use.

According to the exemplary aspect, the equipment request interception module 132 can be implemented using software, hardware and/or a combination thereof. For example, using software, if the library or COM ("component object model") interface to access the specified resource (e.g., physical equipment 30) is known, then a library stub may be written. In another aspect, a dynamic linked library with the same exported functions can be installed. In an exemplary aspect, the equipment request interception module 132 can be registered with the same GUID ("global unique identifier") and can export the same functions as the original library of the equipment in the virtual machine operating system. Then, the equipment request interception module 132 is configured to send function calls directly to the original library if the virtual machine (e.g., virtual machine 26) is running on the server (e.g., server 24B) with the requested resource or otherwise notify the virtual machine migration module 134 to start migration procedure by migrating virtual machine 26 from server 24A to 24B. In doing so, the virtual machine manager 22 can detect when software does not need specific hardware, for example, when something such as close( ) call is executed. In other words, when a software call instantiates a COM object with the original library GUID or if it loads a dynamic linked library ("DLL"), it will receive the installed library stub. Then, at function call, the software will access the library stub, which can control which actions needs to be taken. For example, if the software asks for device parameters of the equipment 30, the library stub can simply provide these parameters if they are known. However, if the software is requesting to use/manipulate the equipment (e.g., starting calculations or the like), the virtual machine manager 22 needs to migrate the virtual machine 26 to the server (e.g., server 24B) coupled to the equipment 30. Moreover, after the software releases the instantiated COM object or unloads the DLL, the virtual machine manager 22 can migrate the virtual machine 26 to another server as further described below.

In another exemplary aspect, the equipment request interception module 132 can perform the interception using hardware. For example, when the requested resource (e.g., physical equipment 30) is connected via a supported hardware bus (e.g., physical connection 32) it can be monitored by the virtual machine manager 22, for example. In one exemplary aspect, COM/parallel interfaces may be tuned to pipes and those pipes can be wrapped to software at the associated server (e.g., server 24B) allowing pass through access to real ports of the resource or notifying the virtual machine migration module that the virtual machine 26 needs to be migrated from server 24A to server 24B. In other words, according to the exemplary aspect, the equipment 30 can be connected via COM/Parallel port at the physical server 24B, for example. Thus, in the exemplary aspect, the virtual machine 26 can emulate COM/Parallel port for the guest operating system of the virtual machine. Accordingly, when the guest operating systems starts work with the port, the virtual machine manager 22 can detect the virtual machine and migrate it to the proper server (e.g., physical server 24B). After virtual machine migration, data transfers to or from the virtual COM/parallel port can be sent or received via host operating system functionality. In one aspect, an additional software module can be provided for the virtual machine to transfer data to and/or from real port to the OS pipe connected to the virtual COM/parallel port.

Moreover, in an exemplary aspect, the equipment request interception module 132 can be implemented via a MS device simulation framework or virtual USB device, for example. In an exemplary aspect, the virtual machine manager 22 can create a virtual USB device with same vendor ID ("VID") and device ID ("DID") as the real IDs and then detect when the guest operating system starts to send data and control packets to the device.

Furthermore, according to another exemplary aspect, if the port coupled to the resource is not in use for a specified time (e.g., a predefined time period as specified by the virtual machine manager 22), then the virtual machine manager 22 can conclude that the migrated virtual machine 26 does not need not anything from the requested resource and may be migrated back to another server to effectively "free up" the physical equipment. In one exemplary aspect, the equipment request interception module 132 can include a USB detector (i.e., if the physical connection 32 is a USB) that may be implemented using Microsoft® device simulation framework, for example.

As described above, according to the exemplary aspect, the virtual machine migration module 134 is configured to migrate the virtual machine 26 running on a first server 24A (see FIG. 1A) for the client device to a second server 24B (see FIG. 1B) that is physically coupled and/or associated with the resource (e.g., the physical equipment 30) requested by the client device (i.e., the virtual machine 26). In one exemplary aspect, if the requested resource is available upon request, the virtual machine migration module 134 preferably can perform that virtual machine migration so that the user session of the client device to the virtual machine 26 is not terminated after migration. Advantageously, the virtual machine 26 will not change its IP address since it is operating in a virtual network set for all virtual machines. As such, after migration, the internal IP is not changed and data of user session (of client device 10) may be forwarded and translated via virtual machine manager 22 without any disconnects.

Moreover, once the server 22 determines that the request resource (e.g., the physical equipment 30) is no longer needed, for example, if the requested task/job is completes, the virtual machine migration module 134 can migrate the virtual machine 26 to another server in the server farm 20, such as the original server 24A or another server 24N, for example. Preferably, the virtual machine migration module 134 selects a server for this migration process so that the selected server has enough resources (e.g., CPU, memory, and the like) to handle the virtual machine 26.

Figure 3:
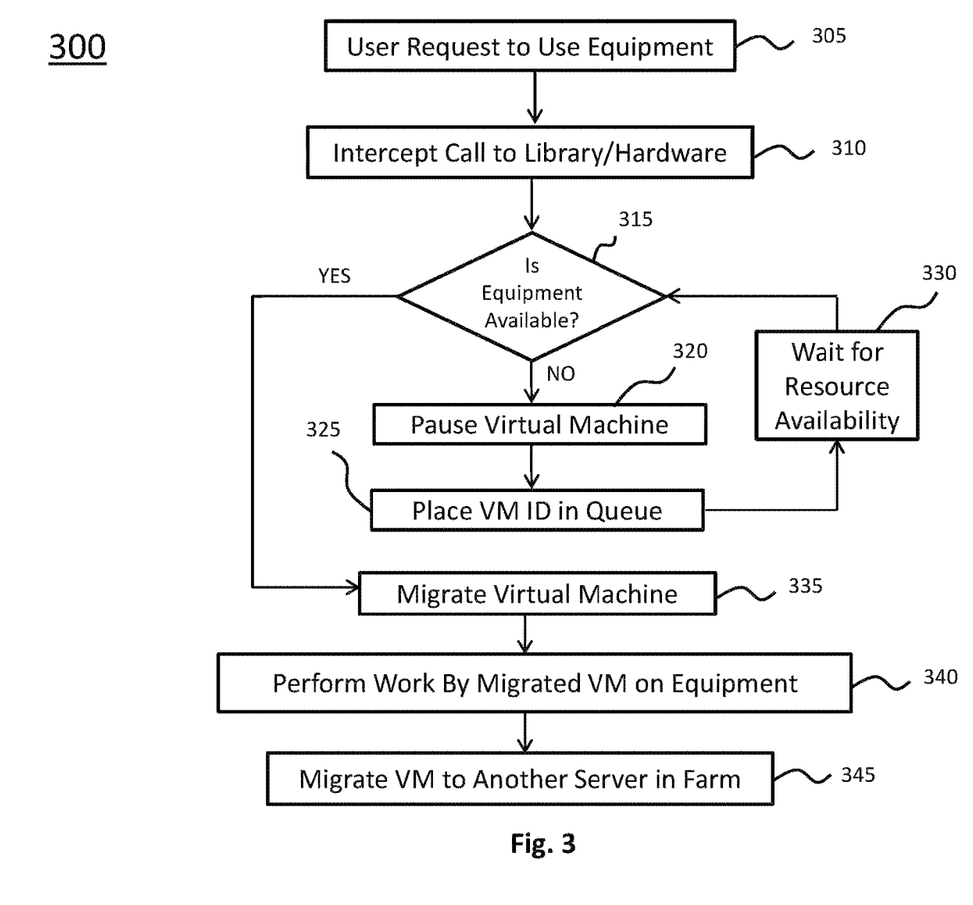
FIG. 3 illustrates a flowchart for a method for migrating a virtual machine between servers to access physical resources according to an exemplary aspect.

FIG. 3 illustrates a flowchart for a method for migrating a virtual machine between servers to access physical resources according to an exemplary aspect. The exemplary method 300 will be described with reference to the components of the exemplary system described above. Moreover, according to the exemplary method 300, the client device 10 will request access and use of a GPU as the requested resource (i.e., physical equipment 30), but it should be appreciated that the exemplary method 300 can be employed to provide access to any type of specialized equipment, such as a DNA sequencer, robotics, or the like.

In general, as described above, the virtual machine manager 22 can include memory 120 and/or monitor libraries utilizing the specialized resources, such as a GPU. Moreover, in one aspect, the presence and availability of each specialized resource can be reported to the user of each client device, for example, even if there is no GPU on the specific server (e.g., server 24A) handling the current user session of the virtual machine 26.

As shown, initially at step 305, the client device 10 (via the virtual machine 26 running on server 24A, for example) requests access and use the GPU. In this aspect, the virtual machine monitor 22 knows or can identify which server in the server farm 20 is currently hosting the user session for the remote software application for the client device 10. Next, at step 310, after the resource request is issued by the client device 10, the equipment request interception module 132 of the virtual machine management module 130 is configured to intercept this resource request as described above. At step 315, the virtual machine manager 22 can check to determine whether the requested GPU is available to be allocated to the requesting client device 10. This can be done by monitoring the physical connection 32 of the equipment 30 (e.g., the GPU) as described above. If it is not available, the virtual machine manager 22 is configured to pause the virtual machine 26 on server 24A at step 320 and then place an ID of the virtual machine 26 in queue or priority queue of the virtual machine manager 22. In one aspect, if the virtual machines have priorities, one virtual machine (e.g., virtual machine 26) may execute more urgent tasks than other virtual machines. Moreover, the method proceeds to step 330 where resource availability checks on the physical server with the resource (e.g., physical equipment 30) and when becomes available when the previous execution next ID is received from the queue. Thus, the method returns to step 315 to confirm that the equipment is available and then a signal can be sent to the virtual machine manager 22 to unpause and migrate the virtual machine 26. Thus, as shown in FIG. 3, steps 315 to 330 are continuously repeated until the requested resource is freed up. In one optional aspect, the virtual machine manager 22 can report to the client device 10 that the requested resource is "not available" and/or that the client device 10 is in a queue to use the resource (e.g., "second in line to access GPU"). The user of client device 10 can then decide to wait or try again later, for example.

In either event, once the virtual machine manager 22 determines that the requested resource (e.g., equipment 30) is available at step 315, the method proceeds to step 335 for the virtual machine migration. That is, as described above, the virtual machine migration module 134 migrates the virtual machine 26 from the current server 24A (i.e., a first server) hosting the user session for the client device 10 to the server (e.g., server 24B) that is associated with and/or physically coupled to the requested resource (i.e., a second server). The migrated virtual machine 26 can then perform the work requested by the client device 10 using the requested resource (e.g., the GPU) at step 340. The virtual machine migration module 134 is configured to continuously (or periodically) check the status of the requested resource by monitoring the physical connection 32, as described above, for example, to ensure that the requested resource is still in use. Once the virtual machine manager 22 determines that the GPU is no longer being used (e.g., the requested task is finished), the virtual machine migration module 134 is configured to migrate at step 345 the virtual machine 26 back to any other server in server farm 20 to free up server 24B connected to the equipment for use by the next requesting client device. Advantageously, the disclosed method 300 provides a server farm 20 with shared servers that effectively reduces the cost for servers.

FIG. 4 illustrates a block diagram of an example of a general-purpose computer system (which can be a personal computer or server) on which the disclosed virtual machine manager 22 (as well as any of the servers in the server farm) can be implemented according to an exemplary aspect. As shown, a general purpose computing device is provided in the form of a computer system 20 or the like including a processing unit 21, a system memory 22, and a system bus 23 that couples various system components including the system memory to the processing unit 21. It should be appreciated that computer system 20 can correspond to the virtual machine manager 22 described above, processing unit 21 can correspond to the CPU 110, system memory 22 can correspond to the memory 120 and/or provided to host virtual machine management module 130 according to an exemplary aspect.

Moreover, the system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 104, such as during start-up, is stored in ROM 24.

The computer 20 may further include the hard disk drive 27 for reading from and writing to a hard disk, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server (e.g., servers 24A to 24N), a router, a network PC, a peer device, physical equipment 30 and/or other common network node, and typically includes many or all of the elements described above relative to the computer 20. The logical connections include a network interface 51 and connected to a local area network (i.e., LAN) 51, for example, and/or a wide area network (not shown). Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In various aspects, the systems and methods described herein may be implemented in software, in which the methods may be stored as one or more instructions or code on a non-volatile computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for migrating a virtual machine (VM) from a first server to a second server to access physical resources, the method comprising:
   intercepting, by a VM manager, a request from a client device to access a physical resource associated with the second server, wherein the interception comprises:
      registering the VM manager using a globally unique identifier;
      accessing, by the VM manager, functions of an original library of the physical resource; and
      sending, by the VM manager, function calls from the client device directly to the original library of the physical resource;
   identifying, by the VM manager, a virtual machine on the first server that is currently hosting a remote application for the client device;
   identifying, by the VM manager, the second server associated with the physical resource; and
   migrating, by the VM manager, the virtual machine from the first server to the second server, such that the client device accesses the physical resource using the second server.

2. The method according to claim 1, further comprising:
   upon intercepting the request from the client device to access the physical resource, determining whether the physical resource is available for access; and
   pausing operation of the virtual machine when the physical resource is not available for access.

3. The method according to claim 2, further comprising:
   continuously checking whether the physical resource is available for access and migrating the virtual machine to the second server upon determining the physical resource is available for access.

4. The method according to claim 1, further comprising:
   maintaining a same user session of the virtual machine launched by the client device when the virtual machine is migrated from the first server to the second server.

5. The method according to claim 1, further comprising:
   migrating, by the processor, the virtual machine from the second server to another server after the client device accesses the physical resource using the second server.

6. The method according to claim 1, wherein the first and second servers are included in a server farm comprising a plurality of servers.

7. The method according to claim 6, wherein the second server is physically connected to the requested physical resource.

8. A method for migrating a virtual machine (VM) from a first server to a second server to access physical resources, the method comprising:
   intercepting, by a VM manager, a request from a client device to access a physical resource, wherein the intercepting of the request to access the physical resource comprises:
      monitoring, by the VM manager, a physical connection between the second server and the requested physical resource;
      tuning, by the VM manager, at least one interface of the requested physical resource to at least one pipe; and
      wrapping, by the VM manager, the at least one pipe to software associated with the second server to provide access to at least one hardware port of the requested physical resource by the virtual machine;
   identifying, by the VM manager, a virtual machine on the first server that is currently hosting a remote application for the client device;
   identifying, by the VM manager, the second server associated with the physical resource; and
   migrating, by the VM manager, the virtual machine from the first server to the second server, such that the client device accesses the physical resource using the second server.

9. A system for migrating a virtual machine (VM) from a first server to a second server to access physical resources, the system comprising:

a memory configured to store association information between at least one physical resource and an associated server; and a VM manager configured to:
intercept a request from a client device to access the at least one physical resource associated with the second server, wherein the configuration to intercept comprises a configuration to:
register the VM manager using a globally unique identifier;
access functions of an original library of the physical resource; and
send function calls from the client device directly to the original library of the physical resource;
identify a virtual machine launched on the first server that is currently hosting a remote application for the client device;
identify the second server associated with the physical resource based on the association information stored in the memory; and
migrate the virtual machine from the first server to the second server, such that the client device accesses the physical resource using the second server.

10. The system according to claim 9, wherein the processor is further configured to:
upon intercepting the request from the client device to access the physical resource, determine whether the physical resource is available for access; and
pause operation of the virtual machine when the physical resource is not available for access.

11. The system according to claim 10, wherein the processor is further configured to continuously check whether the physical resource is available for access and migrate the virtual machine to the second server upon determining the physical resource is available for access.

12. The system according to claim 9, wherein the processor is further configured to maintain a same user session of the virtual machine launched by the client device when the virtual machine is migrated from the first server to the second server.

13. The system according to claim 9, wherein the processor is further configured to migrate the virtual machine from the second server to another server after the client device accesses the physical resource using the second server.

14. The system according to claim 9, wherein the first and second servers are included in a server farm comprising a plurality of servers.

15. The system according to claim 14, wherein the second server is physically connected to the requested physical resource.

16. A system for migrating a virtual machine (VM) from a first server to a second server to access physical resources, the system comprising:
a memory configured to store association information between at least one physical resource and an associated server; and a VM manager configured to:
intercept a request from a client device to access the at least one physical resource associated with the second server, wherein the configuration to intercept comprises a configuration to:
monitor a physical connection between the second server and the requested physical resource;
tune at least one interface of the requested physical resource to at least one pipe; and
wrap the at least one pipe to software associated with the second server to provide access to at least one hardware port of the requested physical resource by the virtual machine;
identify a virtual machine on the first server that is currently hosting a remote application for the client device;
identify the second server associated with the physical resource; and
migrate the virtual machine from the first server to the second server, such that the client device accesses the physical resource using the second server.

17. A non-transitory computer readable medium storing computer executable instructions for migrating a virtual machine (VM) from a first server to a second server to access physical resources, including instructions for:
intercepting, by a VM manager, a request from a client device to access a physical resource associated with the second server, wherein the interception comprises:
registering the VM manager using a globally unique identifier;
accessing, by the VM manager, functions of an original library of the physical resource; and
sending, by the VM manager, function calls from the client device directly to the original library of the physical resource;
identifying, by the VM manager, a virtual machine on the first server that is currently hosting a remote application for the client device;
identifying, by the VM manager, the second server associated with the physical resource; and
migrating, by the VM manager, the virtual machine from the first server to the second server, such that the client device accesses the physical resource using the second server.

18. A non-transitory computer readable medium according to claim 17, further including instructions for:
upon intercepting the request from the client device to access the physical resource, determining whether the physical resource is available for access;
pausing operation of the virtual machine when the physical resource is not available for access; and
continuously checking whether the physical resource is available for access and migrating the virtual machine to the second server upon determining the physical resource is available for access.

* * * * *